United States Patent
Abbas et al.

(10) Patent No.: US 10,329,028 B2
(45) Date of Patent: Jun. 25, 2019

(54) POWER MARGIN INDICATOR DEVICE FOR A ROTORCRAFT, AN ASSOCIATED ROTORCRAFT, AND A CORRESPONDING METHOD

(71) Applicant: AIRBUS HELICOPTERS, Marignane (FR)

(72) Inventors: Gregory Abbas, Marseilles (FR); Damien Gavios, Allauch (FR)

(73) Assignee: AIRBUS HELICOPTERS, Marignane (FR)

(*) Notice: Subject to any disclaimer, the term of this patent is extended or adjusted under 35 U.S.C. 154(b) by 164 days.

(21) Appl. No.: 15/635,426

(22) Filed: Jun. 28, 2017

(65) Prior Publication Data

US 2018/0002032 A1   Jan. 4, 2018

(30) Foreign Application Priority Data

Jul. 1, 2016 (FR) ..................................... 16 01044

(51) Int. Cl.
| | |
|---|---|
| *B64D 43/00* | (2006.01) |
| *G01M 15/04* | (2006.01) |
| *B64C 27/04* | (2006.01) |
| *B64C 27/00* | (2006.01) |

(52) U.S. Cl.
CPC .......... *B64D 43/00* (2013.01); *G01M 15/044* (2013.01); *B64C 27/006* (2013.01); *B64C 27/04* (2013.01)

(58) Field of Classification Search
None
See application file for complete search history.

(56) References Cited

U.S. PATENT DOCUMENTS

| | | |
|---|---|---|
| 5,915,273 A | 6/1999 | Germanetti |
| 6,195,598 B1 | 2/2001 | Bosqui et al. |
| 8,825,228 B2 | 9/2014 | Corpron et al. |

(Continued)

FOREIGN PATENT DOCUMENTS

| | | |
|---|---|---|
| CN | 105416601 | 3/2016 |
| FR | 2749545 | 12/1997 |

(Continued)

OTHER PUBLICATIONS

French Search Report for French Application No. FR 1601044, Completed by the French Patent Office dated Mar. 2, 2017, 8 Pages.

*Primary Examiner* — Redhwan K Mawari
*Assistant Examiner* — Edward Torchinsky
(74) *Attorney, Agent, or Firm* — Brooks Kushman P.C.

(57) ABSTRACT

The present invention relates to A power margin indicator device constituting a first limitation indicator for a rotorcraft, for providing a pilot of said rotorcraft with information about a power margin available on at least one engine and a main power transmission gearbox of said rotorcraft as a function of flying conditions, said device comprising:
  input means for collecting input data corresponding various operating parameters of said at least one engine and of said MGB;
  calculation means connected to said input means, said calculation means serving to determine a collective pitch margin for the blades of a rotor of said rotorcraft; and
  display means presenting said collective pitch margin.

16 Claims, 3 Drawing Sheets

(56) References Cited

U.S. PATENT DOCUMENTS

| | | | | |
|---|---|---|---|---|
| 2009/0186320 A1* | 7/2009 | Rucci | ............... | B64C 27/04 434/33 |
| 2012/0253560 A1* | 10/2012 | Corpron | ............ | B64D 35/04 701/3 |
| 2013/0054053 A1 | 2/2013 | Greenfield et al. | | |
| 2016/0260266 A1* | 9/2016 | Germanetti | ............ | B64C 27/04 |
| 2017/0297732 A1* | 10/2017 | Waltner | ............ | B64D 41/00 |

FOREIGN PATENT DOCUMENTS

| | | |
|---|---|---|
| FR | 2756256 | 5/1998 |
| FR | 2973340 | 10/2012 |

\* cited by examiner

POWER MARGIN INDICATOR DEVICE FOR A ROTORCRAFT, AN ASSOCIATED ROTORCRAFT, AND A CORRESPONDING METHOD

CROSS-REFERENCE TO RELATED APPLICATIONS

This application claims priority to French patent application No. FR 16 01044 filed on Jul. 1, 2016, the disclosure of which is incorporated in its entirety by reference herein.

BACKGROUND OF THE INVENTION

(1) Field of the Invention

The present invention relates to a device for indicating an available power margin for any rotorcraft, and in particular for a helicopter.

(2) Description of Related Art

Generally, in order to pilot a rotorcraft, it is necessary constantly to monitor numerous instruments arranged on an instrument panel and serving in particular to inform the pilot about external flight conditions and about certain operating parameters of the rotorcraft. Such operating parameters may in particular relate to a power plant and/or to a main power transmission gearbox, referred to below as "MGB", relating to the temperature and/or the pressure of fluid flowing through those members that serve to provide the rotorcraft with lift, propulsion, and possibly steering.

Furthermore, for physical reasons, there are numerous limitations, in particular temperature limitations, that the pilot must take into account at all times during a flight. These various limitations generally depend on the stage of flight and on external conditions.

In addition, the vast majority of rotorcraft are fitted specifically with one or two turboshaft engines, generally with free turbine engines. Power is then taken from a low pressure stage of the turbine, which stage is mechanically independent of the assembly constituted by the compressor and the high pressure stage of the turbine. Since a turboshaft engine operates in the range 30,000 revolutions per minute (rpm) to 50,000 rpm, the MGB serves to reduce the speed of rotation at the outlet from the power plant in order to drive the rotor(s) of the rotorcraft in rotation at a speed of rotation NR of the order of 300 rpm to 400 rpm.

Thus, temperature limitations both for the engine and for the MGB serve to define three main ratings for use of the engine:

the takeoff rating that can be used for five to ten minutes and that corresponds to a level of torque for the MGB and to a temperature of the turbine of the engine that can be accepted for a limited length of time without significant degradation: this is the maximum takeoff power (TOP);

the maximum continuous rating during which neither the capabilities of the MGB nor the capabilities that result from the maximum acceptable temperature in front of the high pressure blades of the first stage of the turbine are exceeded at any time: this is maximum continuous power (MCP); and the maximum rating for transient operation that is limited to one or two tens of seconds, and sometimes protected by a regulation stop: this is the maximum transient power (MTP).

There also exist supercontingency ratings on multi-engined aircraft, for use in the event of one engine failing:

the contingency rating during which the capabilities of the its inlet stages of the MGB and the temperature capabilities of the engine are used to the maximum: this is the supercontingency rating that can be used for thirty consecutive seconds at the most, and on three occasions during a flight. It is written 30 sec OEI (one engine inoperative), and if this rating is used, then the engine of the rotorcraft must be dismantled and subjected to a total revision operation;

the contingency rating during which the capabilities of the inlet stages of the MGB and the capabilities of the engine are used to a very great extent: this is a maximum power that can be used for two minutes following 30 sec OEI (written 2 min OEI) or for two minutes and thirty seconds consecutively, at most; and the contingency rating during which the capabilities of the inlet stages of the MGB and the temperature capabilities of the engine are used without damage: this is known as the main contingency power (MCP) (or as OEIcont) and it can be used for thirty minutes to two hours (depending on the engine) continuously for the remainder of the flight after the failure of an engine.

Engine manufacturers use calculation or testing to draw up curves for the power available from a turboshaft engine as a function of altitude and of temperature, and they do this for each of the six above-defined ratings.

The limitations mentioned are generally monitored by means of three operating parameters of the rotorcraft, namely the speed of rotation of the gas generator (NG) of an engine, the torque (TQ) as measured at the engine (TQ1) and/or at the inlet of the MGB (TQ2), and the temperature at which gas is ejected into the inlet of the free turbine (T4).

Furthermore, it is also known and described by the Applicant in Documents FR 2 756 256 and FR 2 973 340, or indeed in Documents US 2013/054053 and CN 105 416 601 to make use of these various parameters for implementing power margin indicators serving to give the pilot(s) a summary indication of power margins, as a replacement for a plurality of conventional indicators that are generally dispersed over the instrument panel.

In order to simplify the workload of the pilot, power margin indicator devices, also known as first limitation indicators (FLIs) comprise a display screen for displaying the limitation that is identified as being the most constraining. Nevertheless, such a concept was devised for rotorcraft using a relationship for variation in the speed of rotation of the main rotor, referred to as the "speed NR" or the "rating NR", that varies little. Furthermore, the role of an FLI device is to provide the pilot or the co-pilot with a power margin indication that has been converted into a margin for the collective pitch of the blades of the rotorcraft. Initially, the FLI device determines the power margin of the engine on the basis of operating parameters (NG, T4, TQ1) and the power margin of the MGB (TQ2), and subsequently it converts this power margin into an equivalent margin for the collective pitch of the blades of the rotor.

On the display screen of the FLI device, a collective pitch index can thus be shown in stationary manner to indicate the current collective pitch of the blades of the rotor. Such an index is also located inside a movable strip that scrolls past the collective pitch margin. The limitations are represented by movable marking on the strip, such as dashes or dots that move along the strip.

An FLI device is very simple for the pilot or the co-pilot to use. So long as the position of the index on the display screen is below a limitation, that limitation cannot be exceeded without new action by the pilot on a control member, such as a collective pitch stick for the blades of the rotor.

Nevertheless, recent models of rotorcraft presently on sale or under development have a control relationship for the speed NR that is no longer constant or that no longer varies little about a nominal value NRnom for 100% operation. Nowadays, such relationships for controlling the speed NR are very dynamic, e.g. varying by a difference of plus or minus 10% relative to the nominal value NRnom.

The power of the engine corresponds to the product of the engine torque multiplied by the speed of rotation NTL of the free turbine. However, the speed of rotation NTL is proportional to the speed of rotation NR of the rotor, as mentioned above. Thus, for demand at constant power, e.g. corresponding to a stationary position of the member for controlling the collective pitch, if the speed NR increases, then the engine torque decreases, and vice versa.

Thus, by way of example, with FLI devices corresponding to the prior art and as shown in FIG. 1, if a rotorcraft is approaching a mountain, its relative altitude above the ground may decrease, and at an instant $t_0$ its relative altitude may become less than 800 feet, causing a relationship for controlling the speed NR to be activated automatically for acoustic reasons. Such an "acoustic" control relationship then modifies the speed NR by reducing it, e.g. to about 97% of the nominal value NRnom. Transiently, in order to brake the rotor, the torque also drops.

Thereafter, if no action is taken on the member for controlling the collective pitch, the engine torque stabilizes on a value that is higher than it was initially when the relative altitude of the rotorcraft was greater than 800 feet, since the engine power remains constant.

Since the torque drops transiently by 76%, for example, the available torque margin displayed on the display screen of the FLI device increases and the limits on this display screen rise. Thereafter, conversely, the torque increases and thus the available torque margin is smaller and the limit moves down on the display screen. However, in the example shown in FIG. 1, since the MCP limit is at 82%, if the pilot takes no action on the member for controlling the collective pitch, the rotorcraft may exceed the limits indicated on the display screen of the FLI device. Such behavior is then inconsistent with the very principle of an FLI device.

Likewise, and as shown in FIG. 2, when a rotorcraft fitted with a prior art device moves away from a mountain, its altitude relative to the ground may increase so that at an instant $t_1$ it reaches an altitude higher than 1000 feet. Under such circumstances, the acoustic control relationship for the speed NR is automatically deactivated since there is no longer an acoustic constraint. The new control relationship then modifies the speed NR so as to increase it. The speed NR may then rise to 100% of the nominal value NRnom. Transiently, in order to accelerate the rotor, the torque increases and then the torque stabilizes on a value that is lower than it was initially when the rotorcraft was at a relative altitude of less than 1000 feet.

Since the torque increases transiently, e.g. to 83%, the available torque margin displayed on the display screen of the FLI device drops and the limits move down on the display screen. Thereafter, as above, since the MCP limit was at 82%, without taking any action on the member for controlling the collective pitch, the pilot may find that the rotorcraft has transiently exceeded the limit shown on the display screen of the FLI device. Such behavior is then inconsistent with the very principle of an FLI device.

Thereafter, conversely, the torque drops so the available torque margin increases and the limit rises on the display screen of the FLI device.

BRIEF SUMMARY OF THE INVENTION

An object of the present invention is thus to propose an FLI device that makes it possible to avoid the above-mentioned limitations. The FLI device thus needs to be able to predict a power margin for a predetermined and usual range of speeds of rotation NR, and not only for the current value of the speed of rotation NR.

The invention thus provides a power margin indicator device constituting a first limitation indicator FLI for a rotorcraft, for providing a pilot of the rotorcraft with information about a power margin available on at least one engine and a main power transmission gearbox MGB of the rotorcraft as a function of flying conditions. Furthermore, such a device comprises:

input means for collecting input data corresponding to at least two distinct operating parameters of the engine(s) and of the main power transmission gearbox MGB;

calculation means connected to the input means, the calculation means serving:

to calculate at least two power margins as a function firstly of respective values of the at least two operating parameters, and secondly of limitation values for at least one of the utilization ratings corresponding to a maximum takeoff power (TOP), a maximum continuous power (MCP), a maximum transient power (MTP), a thirty second one engine inoperative supercontingency power (30 sec OEI), a two minute one engine inoperative contingency power (2 min OEI), and a one engine inoperative continuous contingency power (OEIcont) for the engine(s);

to compare the at least two power margins in order to identify a limiting power margin as being the smallest of the at least two power margins; and to convert the limiting power margin into a collective pitch margin for the blades of a rotor of the rotorcraft; and display means presenting on a display screen the collective pitch margin represented on a scale graduated in collective pitch equivalents in a window of the display screen and an index representative of a current collective pitch of the blades of the rotor.

According to the invention, the device is remarkable in that:

the calculation means are configured to determine the following simultaneously for at least one of the utilization ratings corresponding to the maximum takeoff power (TOP), the maximum continuous power (MCP), the maximum transient power (MTP), the thirty second one engine inoperative supercontingency power (30 sec OEI), the two minute one engine inoperative contingency power (2 min OEI), and the one engine inoperative continuous contingency power (OEIcont) for the engine(s):

initially, a plurality of results corresponding to the collective pitch margin for the blades of the rotor for a plurality of values of the speed of rotation NR of the rotor, the plurality of values of the speed of rotation NR of the rotor forming a predetermined range of values for the speed of rotation NR of the rotor; and subsequently, a plurality of collective pitch limits obtained by summing the current collective pitch of the blades of the rotor with each of the results of the plurality of results; and the display means present at least one planar curve corresponding to the utilization rating(s) corresponding to the maximum takeoff power (TOP), the maximum continuous power (MCP), the maximum transient power (MTP), the thirty second one engine inoperative supercontingency power (30 sec OEI), the two minute one engine inoperative contingency power (2 min OEI), and the one engine inoperative continuous contingency power (OEIcont) for the engine(s), the planar curve(s) being representative of the plurality of collective pitch limits over the predetermined range of values for the speed of rotation NR of the rotor, the planar curve(s) being formed by a set of points presenting as abscissa value the speed of rotation NR of the rotor and as ordinate value a corresponding collective pitch limit, each of the planar curve(s) being capable of moving at least along an ordinate axis relative to the scale graduated in collective pitch equivalents and/or relative to the index representative of a current collective pitch of the blades of the rotor.

In other words, the calculation means determine in parallel a plurality of collective pitch margins for the blades of the rotor over a range of values for the speed of rotation NR of the rotor. The calculation means then add that margin to the current collective pitch in order to identify the collective pitch limit(s) over the range of values for the speed of rotation NR.

The display means of such an FLI device then serve to display on the display screen limits that are expressed in terms of the collective pitch of the blades of the rotor and in the form of planar curves. Thus, when an acoustic control relationship is automatically activated or deactivated, e.g. because the aircraft is passing close to a mountain, the pilot can anticipate the movement of the index relative to the planar curve representative of the limit that is positioned immediately above the index.

Specifically, the pilot (or the co-pilot) can see the index and the closest limit coming closer together on the display screen, corresponding to a relative movement along an abscissa axis on the display screen. Seeing such an approach towards the limit can then enable the pilot to adapt the control setpoint generated by the control member. In practice, the pilot can thus modify the position of the collective pitch lever in order to anticipate approaching the planar curve representative of the collective pitch limit.

Furthermore, the at least two distinct operating parameters may be selected from the group comprising at least: a speed of rotation NG of the gas generator of the engine; a first torque TQ1 measured at the engine; a second torque TQ2 measured at an inlet of the main power transmission gearbox MGB; and a gas ejection temperature T4 measured at the inlet of a free turbine of the engine.

In practice, the predetermined range of values for the speed of rotation NR may be expressed as a percentage of a nominal value NRnom for the speed of rotation NR.

Furthermore, the display screen may also serve to display a current value numerically that is expressed as a percentage of a nominal value NRnom for the speed of rotation NR.

Furthermore, the predetermined range of values for the speed of rotation NR may extend from a minimum speed of NRmin corresponding to 70% of the nominal value NRnom for the speed of rotation NR, to a maximum speed NRmax corresponding to 130% of the nominal value NRnom of the speed of rotation NR.

Such a range of values serve to make it possible to cover all of the speeds NR that can be reached by the rotorcraft presently on sale or under development and corresponding to various relationships for controlling the speed NR as a function of the altitude and/or of the stages of flight of the rotorcraft.

Furthermore, to represent and display the index and the planar curves on the display screen, various embodiments can be envisaged.

Specifically, in a first embodiment, the index representative of the current collective pitch may be capable of moving along an abscissa axis relative to the scale graduated in collective pitch equivalents, and/or relative to the planar curve(s).

Under such circumstances, the planar curves representative of the collective pitch limits can move only along the ordinate axis displayed on the display screen.

In a second embodiment, the planar curve(s) may be capable of moving both along the ordinate axis and an abscissa axis relative to the scale graduated in collective pitch equivalents, and/or relative to the index representative of the current collective pitch of the blades of the rotor.

Under such circumstances, the index representative of the current collective pitch can then remain stationary and centered on the display screen during an upward or downward modification of the current speed NR and/or of a control setpoint for the current collective pitch issued by the pilot of the rotorcraft. These abscissa and ordinate axes can then move together in translation relative to the index centered on the display screen.

Advantageously, the planar curve(s) may be representative of an increasing function.

Specifically, it is usual for the various collective pitch limits to increase with increasing speed NR, and vice versa.

In practice, the display means may present at least two planar curves corresponding to two of the utilization ratings corresponding to the maximum takeoff power (TOP), the maximum continuous power (MCP), the maximum transient power (MTP), the thirty second one engine inoperative supercontingency power (30 sec OEI), the two minute one engine inoperative contingency power (2 min OEI), and the one engine inoperative continuous contingency power (OEIcont) for the engine(s); the at least two planar curves being representative of at least two different pluralities of collective pitch limits over the predetermined range of values for the speed of rotation NR of the rotor, the at least two planar curves being parallel to each other.

Thus, any straight line normal to at least one of the at least two planar curves is also normal to the other of the at least two planar curves. The distance between the two points of intersection of the normal with the at least two planar curves is then a constant.

The invention also provides a rotorcraft including at least one engine and a main power transmission gearbox MGB for driving rotation of at least one main rotor.

Such a rotorcraft is remarkable in that it includes an FLI power margin indicator device as described above.

The invention also provides a method of providing a pilot of a rotorcraft with information about a power margin available on at least one engine and a main power transmission gearbox MGB of the rotorcraft as a function of flying conditions, the method comprising:

a collection step for collecting input data corresponding to at least two distinct operating parameters of the engine (s) and the main power transmission gearbox MGB;

a calculation step for calculating at least two power margins as a function firstly of respective values of the at least two operating parameters, and secondly of limitation values for at least one of the utilization ratings corresponding to a maximum takeoff power (TOP), a maximum continuous power (MCP), a maximum transient power (MTP), a thirty second one engine inoperative supercontingency power (30 sec OEI), a two minute one engine inoperative contingency power (2 min OEI), and a one engine inoperative continuous contingency power (OEIcont) for the engine(s);

a comparison step for comparing the at least two power margins and identifying a limiting power margin as being the smallest of the at least two power margins; and a conversion step for converting the limiting power margin into a collective pitch margin for the blades of a rotor of the rotorcraft; and a display step for presenting on a display screen the collective pitch margin represented on a scale graduated in collective pitch equivalents in a window of the display screen and an index representative of a current collective pitch of the blades of the rotor.

According to the invention, such a method is remarkable in that:

the calculation, comparison, and conversion steps serve to determine the following simultaneously for at least one of the utilization ratings corresponding to the maximum takeoff power (TOP), the maximum continuous power (MCP), the maximum transient power (MTP), the thirty second one engine inoperative supercontingency power (30 sec OEI), the two minute one engine inoperative contingency power (2 min OEI), and the one engine inoperative continuous contingency power (OEIcont) for the engine(s):

initially, a plurality of results corresponding to the collective pitch margin for the blades of the rotor for a plurality of values of the speed of rotation NR of the rotor, the plurality of values of the speed of rotation NR of the rotor forming a predetermined range of values for the speed of rotation NR of the rotor; and subsequently, a plurality of collective pitch limits obtained by summing the current collective pitch of the blades of the rotor with each of the results of the plurality of results; and the display step presents at least one planar curve corresponding to the utilization rating(s) corresponding to the maximum takeoff power (TOP), the maximum continuous power (MCP), the maximum transient power (MTP), the thirty second one engine inoperative supercontingency power (30 sec OEI), the two minute one engine inoperative contingency power (2 min OEI), and the one engine inoperative continuous contingency power (OEIcont) for the engine(s), the planar curve(s) being representative of the plurality of collective pitch limits over the predetermined range of values for the speed of rotation NR of the rotor, the planar curve(s) being formed by a set of points presenting as abscissa value the speed of rotation NR of the rotor and as ordinate value a corresponding collective pitch limit, each of the planar curve(s) being capable of moving at least along an ordinate axis Y relative to the scale graduated in collective pitch equivalents and/or relative to the index representative of a current collective pitch of the blades of the rotor.

In other words, the calculation, comparison, and conversion steps determine a plurality of collective pitch margins in parallel for the blades of the rotor over a range of values for the speed of rotation NR of the rotor. A summing calculation makes it possible to calculate the sum of the collective pitch margin plus the current collective pitch in order to identify the collective pitch limit(s) over the range of values for the speed of rotation NR.

The display step serves to display the limits on the display screen expressed in terms of collective pitch for the blades of the rotor presented in the form of planar curves. Thus, when an acoustic control relationship is automatically activated or deactivated as a result of the aircraft passing close to a mountain, the pilot can then anticipate the movement of the index relative to the planar curve representative of the limit located immediately above the index.

Specifically, by means of such a method, the pilot (or the co-pilot) can see the index coming closer to the closest limit on the display screen, which corresponds to a relative movement along an abscissa axis on the display screen. Seeing an approach to the limit in this way can thus enable the pilot to adapt the control setpoint generated by the control member. In practice, the pilot can thus modify the position of the collective pitch stick in order to anticipate approaching the planar curve representative of the collective pitch limit.

As mentioned above, the display step may advantageously present at least two planar curves representative of at least two different pluralities of collective pitch limits over the predetermined range of values for the speed of rotation NR of the rotor, the at least two planar curves being mutually parallel.

BRIEF DESCRIPTION OF THE DRAWINGS

The invention and its advantages appear in greater detail from the context of the following description of examples given by way of illustration and with reference to the accompanying figures, in which.

Elements that are present in more than one of the figures are given the same references in each of them.

DETAILED DESCRIPTION OF THE INVENTION

As already mentioned, the invention relates to an FLI device for indicating a power margin and to a rotorcraft fitted with such an FLI device.

Figure 1:
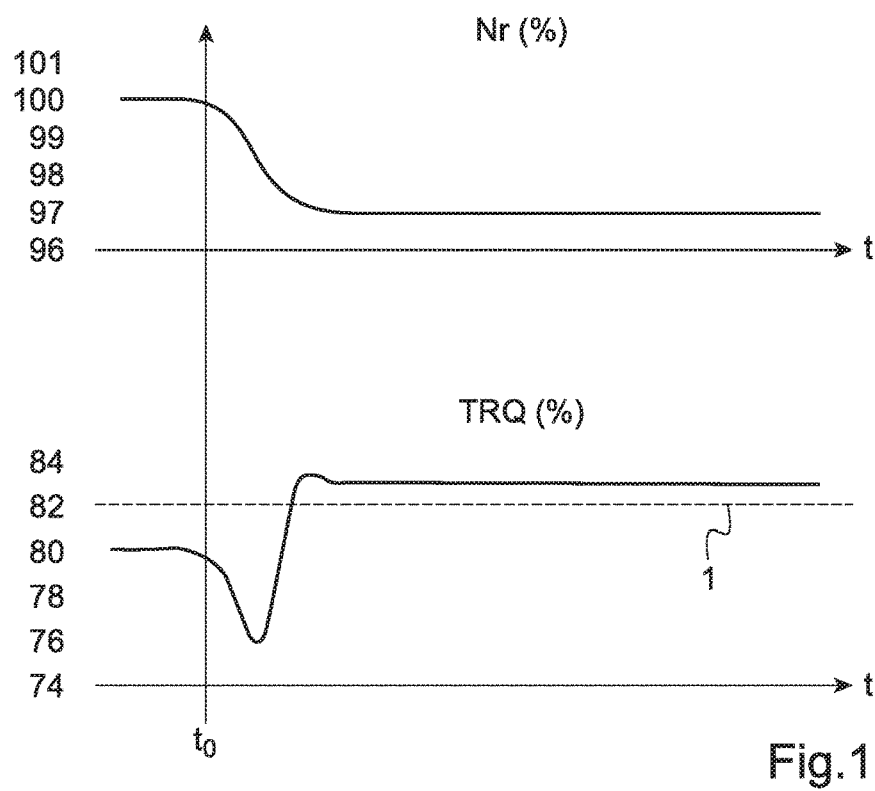
FIGS. 1 and 2 are prior art curves showing relationships for controlling the speed NR and the associated engine torque as a function of time.
Figure 2:
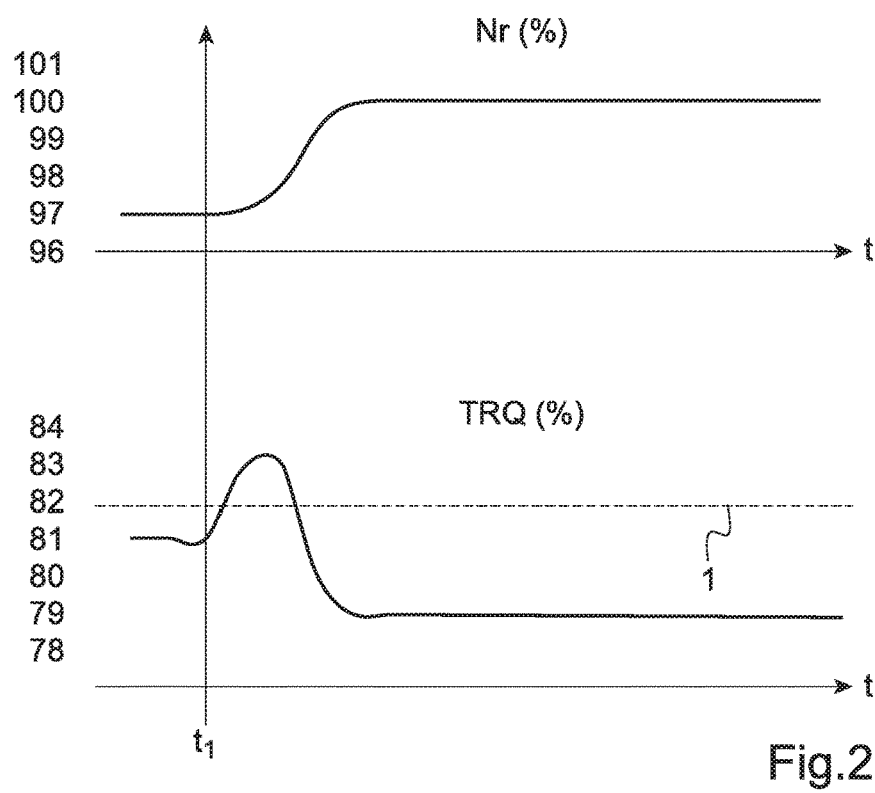
Figure 3:
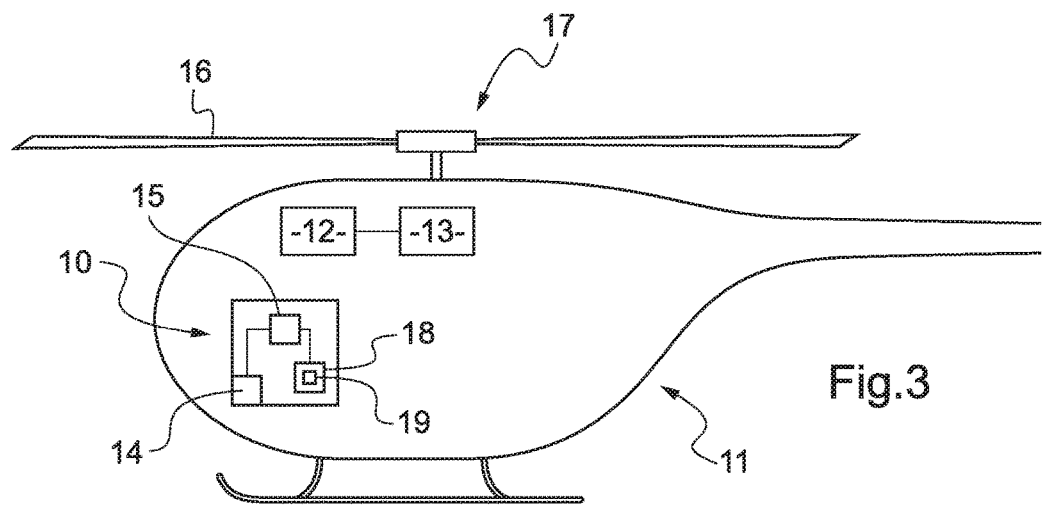
FIG. 3 is a diagrammatic side view of a rotorcraft fitted with an FLI device in accordance with the invention.

As shown in FIG. 3, a rotorcraft 11 has at least one engine 12 and a main power transmission gearbox MGB 13. The engine torque delivered by the engine 12 is thus transmitted to the MGB 13, which drives rotation of a rotor 17 having blades 16.

The FLI device 10 is installed in the rotorcraft 11 and has input means 14 for collecting input data coming in particular from the engine 12 and the MGB 13, and corresponding to operating parameters of the engine 12 and of the MGB 13. Such an FLI device 10 is then connected by wires or wirelessly either directly to the engine 12 and the MGB 13, or else indirectly via any member of the rotorcraft 11 that centralizes the operating parameters of the engine 12 and of the MGB 13.

The FLI device 10 also has calculation means 15 electrically connected with the input means 14 in order to calculate power margins as a function of the operating parameters of the engine 12 and of the MGB 13, and also limitations for the various utilization ratings of the engine 12, namely the TOP, MCP, MTP, 30 sec OEI, 2 min OEI, or OEIcont ratings.

Furthermore, the calculation means 15 also serve to compare the various previously calculated power margins in order to determine the smallest of the available power margin. This limiting power margin is then converted into collective pitch margins for the blades 16 of the rotor 17 for respective values of the speed of rotation NR in a predetermined range of values.

By way of example, the calculation means may comprise a processor, an integrated circuit, a computer, a programmable system, or a logic circuit, these examples not limiting the scope to be given to the term "calculation means".

Finally, the FLI device 10 has display means 18 comprising a display screen 19 on which the collective pitch margin is displayed in a window.

Figures 4, 5:
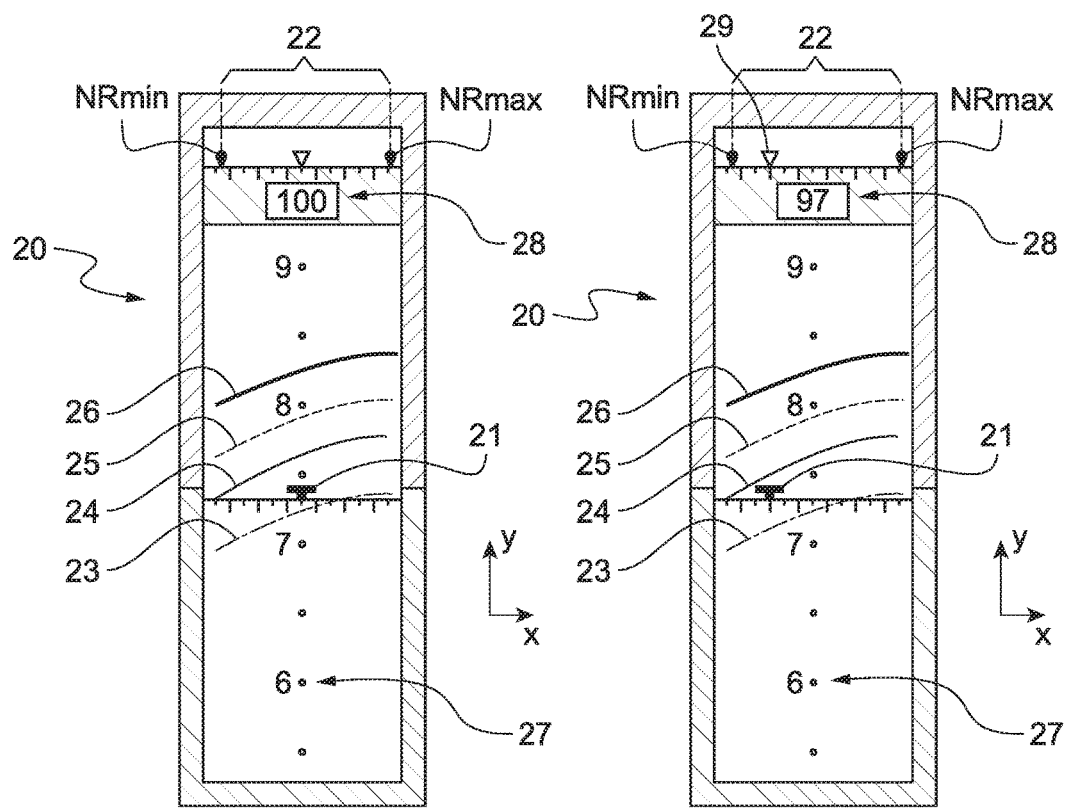
FIGS. 4 to 6 show various implementations of windows on a display screen of an FLI device in accordance with the invention.

As shown in FIG. 4, and by way of example, such a window 20 serves to display four planar curves 23-26 representative of limits for the collective pitch margin as a function of the speed NR of the rotor 17 of the rotorcraft 11. Particularly, but not exclusively, such planar curves 23-26 may be increasing and mutually parallel over a predetermined range 22 of values for the speed NR plotted along an abscissa axis X.

An index 21 representative of a current collective pitch of the blades 16 of the rotor 17 is thus positioned in the window 20, and its position relative to the planar curves 23-26 enables the pilot to anticipate an automatic variation of the speed NR relative to the nominal speed NRnom. A zone 28 of the window 20 also serves to display the speed NR expressed as a percentage of the nominal value NRnom.

The current speed NR can thus vary automatically between the minimum speed NRmin and the maximum speed NRmax of the predetermined range 22.

Furthermore, a scale 27 graduated in collective pitch equivalents may be positioned in stationary manner in the middle of the window, parallel to the ordinate axis Y.

As shown, the planar curves 23-26 may be formed by way of example by a first planar curve 23 representative of a refuge pitch limit, a second planar curve 24 representative of an MCP limit, a third planar curve 25 representative of a TOP limit, and a fourth planar curve 26 representative of an MTP limit.

Furthermore, in a rotorcraft having at least two engines, if one of the engines fails, the planar curves 23-26 may then be formed by a first planar curve 23, a second planar curve 24 representative of an OEIcont limit, a third planar curve 25 representative of a 2 min OEI limit, and a fourth planar curve 26 representative of a 30 sec OEI limit.

Furthermore, in a first embodiment as shown in FIG. 5, the window 20 may display an index 21 that is movable along the abscissa axis X relative to the scale 27.

Thus, when the current collective pitch reaches a value, e.g. of 97% of the nominal speed NRnom, as indicated in the zone 28, the index 21 moves to the left of the scale 27 and tends to approach the second planar curve 24. An arrow 29 also serves to illustrate the positioning of the current collective pitch within the predetermined range 22.

Nevertheless, the index 21 remains centered in the window 20 along the ordinate axis Y, but the planar curves 23-26 may move along this ordinate axis Y relative to the index 21. Furthermore, the index 21 and the arrow 29 remain in alignment on a straight line parallel to the ordinate axis Y.

Figure 6:
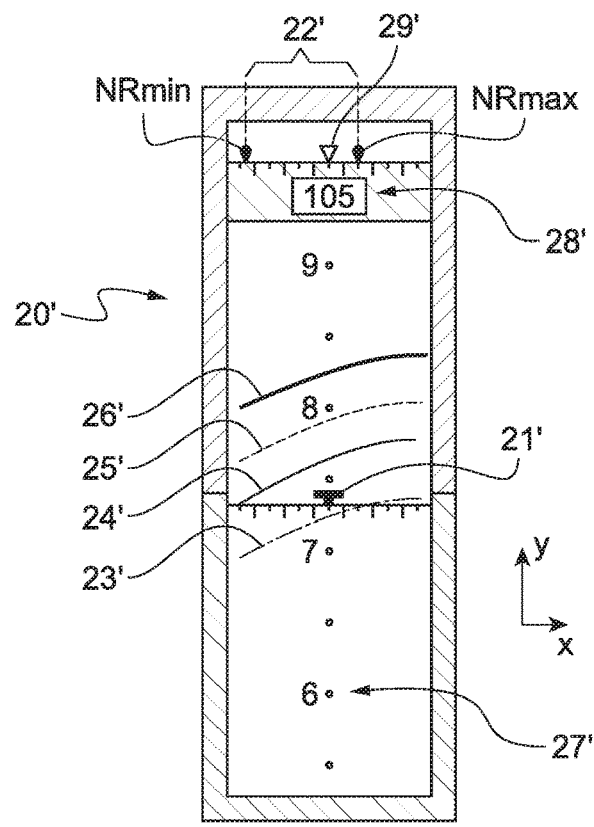

Furthermore, in a second embodiment, as shown in FIG. 6, the index 21' may also remain stationary in the window 20' being centered on the scale 27' along the abscissa axis X. Under such circumstances, the planar curves 23'-26' may then move along both the abscissa axis X and the ordinate axis Y relative to the index 21'.

Furthermore, the arrow 29' showing the positioning of the current collective pitch in the predetermined range 22' remains centered along the abscissa axis X on the scale 27'. Under such circumstances, the maximum or minimum values NRmax or NRmin of the predetermined range 22' move relative to the arrow 29'.

Under such circumstances, the zone 28' serves to indicate a current collective pitch value that may be equal, for example, to 105% of the nominal value NRnom.

Figure 7:
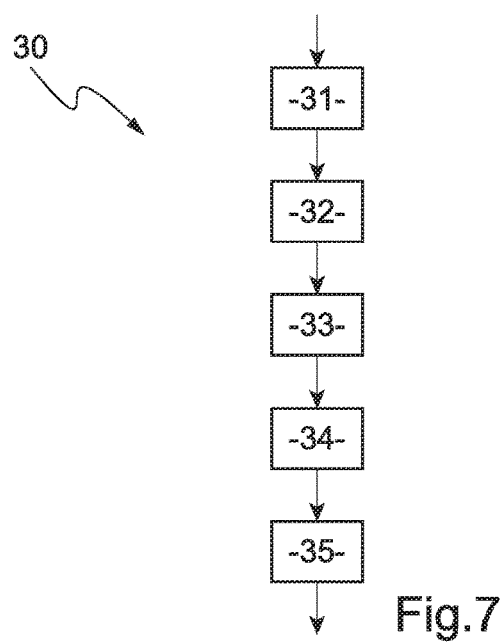
FIG. 7 is a block diagram showing the method of providing power margin information in accordance with the invention.

As shown in FIG. 7 and as already mentioned, the invention also provides a method 30 enabling a pilot of a rotorcraft 11 to be provided with information about the power margin available on at least one engine 12 and an MGB 13 of the rotorcraft 11 as a function of flying conditions.

Thus, such a method 30 has a collection step 31 for collecting input data corresponding to various operating parameters of the engine 12 and of the MGB 13.

The method 30 then has a calculation step 32 for calculating at least two power margins as a function firstly of values of the operating parameters T4, NG, TQ1, and TQ2 of the engine 12 and of the MGB 13, and also secondly of limitation values for the various utilization ratings TOP, MCP, MTP, 30 sec OEI, 2 min OEI, and OEIcont of the engine 12.

Such a method 30 also has a comparison step 33 for comparing the at least two power margins and for identifying a limiting power margin as being the smallest of the at least two power margins.

Thereafter, the method 30 includes a conversion step 34 for converting the limiting power margin into a collective pitch margin for the blades 16 of the rotor 17 of the rotorcraft 11.

Furthermore, the calculation, comparison, and conversion steps 32, 33, and 34 make it possible to determine the following simultaneously:
- initially, a plurality of results corresponding to the collective pitch margin for the blades 16 of the rotor 17 for a plurality of values of the speed of rotation NR of the rotor 17, the plurality of values for the speed of rotation NR of the rotor 17 forming a predetermined range 22, 22' of values for the speed of rotation NR of the rotor 17; and
- subsequently, a plurality of collective pitch limits obtained by summing the current collective pitch of the blades 16 of the rotor 17 with each of the results in the plurality of results.

Finally, the method 30 has a display step 35 of showing on the display screen 19 the collective pitch margin represented on a scale that is graduated in collective pitch equivalents in the window 20, 20' of the display screen 19 together with an index 21, 21' representative of the current collective pitch of the blades 16 of the rotor 17.

Such a display step 35 thus serves to present at least one planar curve 23-26, 23'-26' representative of the plurality of collective pitch limits over the predetermined range 22, 22' of values for the speed of rotation NR of the rotor 17. These planar curves 23-26, 23'-26' are thus formed by a set of points presenting at an abscissa value a parameter that is a function of a speed of rotation NR of the rotor 17, and at an ordinate value a corresponding collective pitch limit.

Furthermore, each of the planar curves 23-26, 23'-26' is suitable for moving at least along an ordinate axis Y relative to the scale 27, 27' graduated in collective pitch equivalents, and/or relative to the index 21, 21' representative of the current collective pitch of the blades 16 of the rotor 17.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A power margin indicator device constituting a first limitation indicator for a rotorcraft, for providing a pilot of the rotorcraft with information about a power margin available on at least one engine and a main power transmission gearbox of the rotorcraft as a function of flying conditions, the device comprising:
    input means for collecting input data corresponding to at least two distinct operating parameters of the at least one engine and of the main power transmission gearbox;
    calculation means connected to the input means, the calculation means serving:
        to calculate at least two power margins as a function firstly of respective values of the at least two operating parameters, and secondly of limitation values for at least one of the utilization ratings corresponding to a maximum takeoff power, a maximum continuous power, a maximum transient power, a thirty second one engine inoperative supercontingency power, a two minute one engine inoperative contingency power, and a one engine inoperative continuous contingency power for the at least one engine;
        to compare the at least two power margins in order to identify a limiting power margin as being the smallest of the at least two power margins; and
        to convert the limiting power margin into a collective pitch margin for the blades of a rotor of the rotorcraft; and
    display means presenting on a display screen the collective pitch margin represented on a scale graduated in collective pitch equivalents in a window of the display screen and an index representative of a current collective pitch of the blades of the rotor;
    wherein:
        the calculation means are configured to determine the following simultaneously for at least one of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine:
            initially, a plurality of results corresponding to the collective pitch margin for the blades of the rotor for a plurality of values of the speed of rotation of the rotor, the plurality of values of the speed of rotation of the rotor forming a predetermined range of values for the speed of rotation of the rotor; and
            subsequently, a plurality of collective pitch limits obtained by summing the current collective pitch of the blades of the rotor with each of the results of the plurality of results; and
        the display means present at least one planar curve corresponding to the at least one of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine, the at least one planar curve being representative of the plurality of collective pitch limits over the predetermined range of values for the speed of rotation of the rotor, the at least one planar curve being formed by a set of points presenting as abscissa value the speed of rotation of the rotor and as ordinate value a corresponding collective pitch limit, each of the at least one planar curves being capable of moving at least along an ordinate axis Y relative to the scale graduated in collective pitch equivalents and/or relative to the index representative of a current collective pitch of the blades of the rotor.

2. The device according to claim 1, wherein the at least two distinct operating parameters are selected from the group comprising at least: a speed of rotation of a gas generator of the engine; a first torque measured at the engine; a second torque measured at an inlet of the main power transmission gearbox; and a gas ejection temperature T4 measured at the inlet of a free turbine of the engine.

3. The device according to claim 1, wherein the predetermined range of values for the speed of rotation is expressed as a percentage of a nominal value for the speed of rotation.

4. The device according to claim 3, wherein the predetermined range of values for the speed of rotation extends from a minimum speed corresponding to 70% of the nominal value for the speed of rotation, to a maximum speed corresponding to 130% of the nominal value of the speed of rotation.

5. The device according to claim 1, wherein the index representative of the current collective pitch is capable of moving along an abscissa axis X relative to the scale graduated in collective pitch equivalents, and/or relative to the at least one planar curve.

6. The device according to claim 1, wherein each of the at least one planar curve is capable of moving both along the ordinate axis Y and an abscissa axis X relative to the scale graduated in collective pitch equivalents, and/or relative to the index representative of the current collective pitch of the blades of the rotor.

7. The device according to claim 1, wherein the at least one planar curve is representative of an increasing function.

8. The device according to claim 1, wherein the display means present at least two planar curves corresponding to two of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine; the at least two planar curves being representative of at least two different pluralities of collective pitch limits over the predetermined range of values for the speed of rotation of the rotor, the at least two planar curves being parallel to each other.

9. A rotorcraft including at least one engine and a main power transmission gearbox for driving rotation of at least one main rotor, wherein the rotorcraft includes a power margin indicator according to claim 1.

10. A method for providing a pilot of a rotorcraft with information about a power margin available on at least one engine and a main power transmission gearbox of the rotorcraft as a function of flying conditions, the method comprising:
   a collection step for collecting input data corresponding to at least two distinct operating parameters of the at least one engine and the main power transmission gearbox;
   a calculation step for calculating at least two power margins as a function firstly of respective values of the at least two operating parameters, and secondly of limitation values for at least one of the utilization ratings corresponding to a maximum takeoff power (TOP), a maximum continuous power, a maximum transient power, a thirty second one engine inoperative supercontingency power, a two minute one engine inoperative contingency power, and a one engine inoperative continuous contingency power for the at least one engine;
   a comparison step for comparing the at least two power margins and identifying a limiting power margin as being the smallest of the at least two power margins;
   a conversion step for converting the limiting power margin into a collective pitch margin for the blades of a rotor of the rotorcraft; and
   a display step for presenting on a display screen the collective pitch margin represented on a scale graduated in collective pitch equivalents in a window of the display screen and an index representative of a current collective pitch of the blades of the rotor;
   wherein:
   the calculation, comparison, and conversion steps serve to determine the following simultaneously for at least one of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine:
      initially, a plurality of results corresponding to the collective pitch margin for the blades of the rotor for a plurality of values of the speed of rotation of the rotor, the plurality of values of the speed of rotation of the rotor forming a predetermined range of values for the speed of rotation of the rotor; and
      subsequently, a plurality of collective pitch limits obtained by summing the current collective pitch of the blades of the rotor with each of the results of the plurality of results; and
   the display step presents at least one planar curve corresponding to the at least one of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine, the at least one planar curve being representative of the plurality of collective pitch limits over the predetermined range of values for the speed of rotation of the rotor, the at least one planar curve being formed by a set of points presenting as abscissa value the speed of rotation of the rotor and as ordinate value a corresponding collective pitch limit, each of the at least one planar curves being capable of moving at least along an ordinate axis Y relative to the scale graduated in collective pitch equivalents and/or relative to the index representative of a current collective pitch of the blades of the rotor.

11. The method according to claim 10, wherein the predetermined range of values for the speed of rotation is expressed as a percentage of a nominal value for the speed of rotation.

12. The method according to claim 10, wherein the predetermined range of values for the speed of rotation extends from a minimum speed corresponding to 70% of the nominal value for the speed of rotation, to a maximum speed corresponding to 130% of the nominal value of the speed of rotation.

13. The method according to claim 10, wherein the index representative of the current collective pitch is capable of moving along an abscissa axis X relative to the scale graduated in collective pitch equivalents, and/or relative to the at least one planar curve.

14. The method according to claim 10, wherein each of the at least one planar curve is capable of moving both along the ordinate axis Y and an abscissa axis X relative to the scale graduated in collective pitch equivalents, and/or relative to the index representative of the current collective pitch of the blades of the rotor.

15. The method according to claim 10, wherein the at least one planar curve is representative of an increasing function.

16. The method according to claim 10, wherein the display step presents at least two planar curves corresponding to two of the utilization ratings corresponding to the maximum takeoff power, the maximum continuous power, the maximum transient power, the thirty second one engine inoperative supercontingency power, the two minute one engine inoperative contingency power, and the one engine inoperative continuous contingency power for the at least one engine; the at least two planar curves being representative of at least two different pluralities of collective pitch limits over the predetermined range of values for the speed of rotation of the rotor, the at least two planar curves being parallel to each other.

* * * * *